Aug. 5, 1969  R. G. GIDLOW  3,458,941
FREEZE DRYING APPARATUS AND PROCESS
Filed March 13, 1968
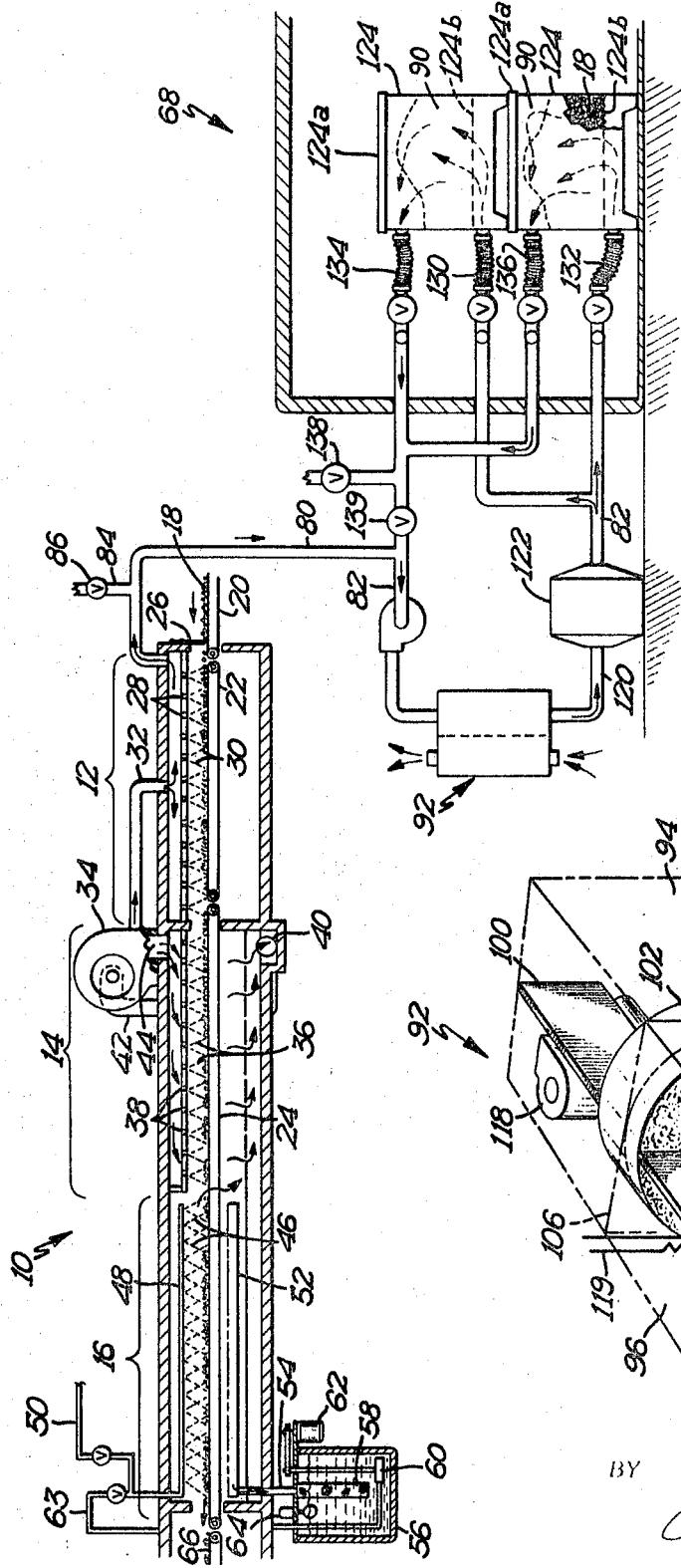
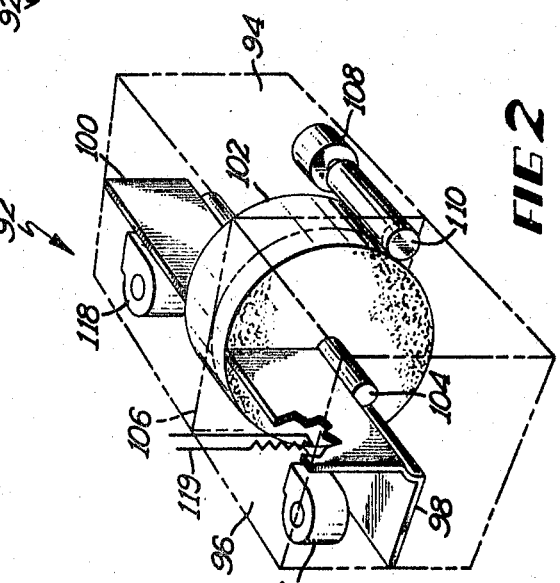
INVENTOR.
ROLF G. GIDLOW
BY
ATTORNEY

3,458,941
FREEZE DRYING APPARATUS AND PROCESS
Rolf Gunnar Gidlow, St. Paul, Minn., assignor to The Pillsbury Company, Minneapolis, Minn., a corporation of Delaware
Continuation-in-part of application Ser. No. 673,593, Oct. 9, 1967. This application Mar. 13, 1968, Ser. No. 712,775
Int. Cl. F26b 5/06, 15/18, 5/10
U.S. Cl. 34—5
12 Claims

ABSTRACT OF THE DISCLOSURE

Apparatus for drying products in a frozen condition consisting of a chamber for freezing the products under cryogenic conditions by exposing the food products to liquid nitrogen, solid $CO_2$ or similar cooling medium, ducts for collecting the gas that is evolved in the process of freezing the material and a chamber for drying the product. The collected gas is circulated through the drying chamber in heat and mass transfer relationship with the frozen product. In this manner an inexpensive supply of an inert gas of low humidity is made available for the drying operation. The low oxygen content of the gas reduces oxidative damage to the product as it is dried.

---

The present invention relates to an apparatus and process for freeze-drying products including foods, biological materials, pharmaceutical products and chemicals. The present invention is a continuation-in-part of my prior application, Ser. No. 673,593, filed on Oct. 9, 1967.

Cryogenic freezing with liquified gas was first investigated by Cathart and Luber in 1939, as reported in Industrial Engineering Chemistry, 31, 362–368. The process made possible the rapid transition through the phase change from the liquid to the solid state (20° F. -28° F. in food products). This rapid transition produces much better results than relatively slow freezing rates particularly with regard to the smaller crystal structure that is obtained, the absence of ice needles and the retardation of staling in baked goods. Contact between liquid nitrogen and unchilled food products must be prevented due to the relatively low contact area between the product and the liquid nitrogen that results from violent boiling of the product surface as well as the cracking and peeling of many products due to the thermal shock and violent contraction of the outer surface. These effects are prevented by exposing the product to cold nitrogen vapor for the purpose of pre-cooling the product prior to exposure to the nitrogen in liquid form. In this way, the surface gradually is prepared for contact with a liquid nitrogen spray, but the evolved gas is nevertheless wasted.

While existing cryogenic freezing processes are highly effective in producing frozen foods of high quality, the resulting product must be stored usually at considerable expense and the evolved nitrogen gas is wasted. The process, moreover, is unsuited for many applications where frozen storage is impossible. Thus, one major objective of the invention is to provide a process for preparing a product that is initially frozen with a spray of liquid nitrogen or other cryogenic heat transfer medium and is thereafter dried at relatively low additional processing cost.

By "cryogenic freezing" as used herein is meant a freezing process wherein the product being frozen is exposed to a solidified or liquified gas substantially free of oxygen. The gas can consist of liquid nitrogen, liquid nitrous oxide, solid carbon dioxide and the like.

The acceptability of oven-dried foods has been limited by poor eating qualities and the relatively high temperature employed in conventional hot air dryers. Dehydrated products of a much better quality have been produced by freeze-drying. In a conventional freeze-drying process the food products or other material that is being dried is first frozen and the moisture is removed by sublimation. The drying operation that follows is usually carried out in a vacuum with conduction or irradiation supplying the required latent heat of sublimation of the ice. As early as 1959 small histological specimens were dried by passing air over them within a drying chamber maintained under freezing conditions (−22° F.). Air was dried by passing it through a desiccator to maintain the partial pressure of water at a low value. Atmospheric freeze-drying has at least two disadvantages. The first is the requirement for large volumes of refrigerated air. Furthermore, while atmospheric freeze-drying has a number of advantages, the oxygen content of the air employed is detrimental to readily oxidizable products even at low temperatures especially over prolonged periods of exposure.

In view of these and other deficiencies of the prior art, it is an object of the present invention to provide an improved freeze-drying system for materials such as foods, pharmaceuticals, biological materials and the like having the following advantages and capabilities: (a) the ability to efficiently dehydrate products to a low-moisture level (on the order of 2% moisture) by initially subjecting the products to cryogenic freezing with a provision for reclaiming and using evolved gases; (b) a provision for drying the food products with little or no exposure to oxygen; (c) a provision for utilizing the low temperature of the gas evolved during the freezing operation to maintain the products at a low temperature during subsequent drying operations thereby improving the thermal efficiency of the operation; (d) a provision for circulating gas through the product as it dries at a rate substantially different from the rate at which the gas is evolved during the freezing operation; (e) control over the humidity of the drying gas before it is introduced to the drying zone so that it is capable of receiving moisture from the frozen product; (f) a provision for exhausting the same quantity of gas from the dryer that is received from the freezing operation and (g) a means for drying food products in an oxygen-free atmosphere without the necessity for operating personnel to wear gas masks.

In the first phase of the process in accordance with the present invention, the product that is to be dried is ex posed to a refrigerated, substantially oxygen-free gas either solid or liquid state. In the second phase, the frozen product is dried. Separate treatment chambers are provided for each of these operations. The first is a freezing chamber which is divided into three sections. The second is a drying chamber. The freezing chamber includes two pre-cooling sections and a final freezing section, a refrigeration unit, a conveyor system and suitable ducting. Instrumentation is provided to operate the unit and to monitor the operation. The freezing operation is preferably but not necessarily carried out with a product travelling through the freezing apparatus. The drying operation is preferably carried out with a product in a static condition.

During the freezing operation the product is first exposed to the refrigerated substantially oxygen-free evolved gas that is initially at a relatively high temperature and finally at a lower temperature. The product is then exposed to the freezing medium from which the gas is evolved in a solid or liquified condition. Liquid nitrogen is the usual freezing medium.

In a preferred form of the apparatus, the product being introduced to the freezer is placed on a conveyor such as an endless flexible belt conveyor and is spread to form a bed of a defined thickness, generally on the order of ½ inch thick. While the speed of the conveyor and the length of the exposure time in the freezing chamber will vary considerably, the product should be maintained within the treatment chamber for a period of about 1–5 minutes.

In the drying phase of the process, the dry and substantially oxygen-free gas that is evolved in the freezing chamber is fed through a duct to the drying chamber and is forced around and through the material that is being dried to carry away the water molecules.

An important feature of the present invention is the use of the same gas for freezing as for drying during a subsequent phase of the process. As the relatively dry inert gas passes through and around the product being dried, the water vapor in the vicinity of the ice crystals and the drying boundary layer passes through the shell of the already dried material to the surface of the specimen and is carried away by the dry gas passing over it.

To assure proper operation the carrier gas must be maintained in a relatively dry condition. It must be sufficiently dry at atmospheric pressure to create a partial pressure of water vapor at the specimen surface which approaches zero. The heat required to affect sublimation at the optimum rate is achieved by maintaining the temperature of the inert drying gas at the proper value as it passes through and around the product being dried. It is unnecessary in the present process to provide heat from some outside source, for example, by means of radiation or dielectric heating because the temperature of the product can be reliably maintained by the desiccating gas in spite of the insulating layer of porous material surrounding the receding ice crystals at the center of each piece being dried.

The pieces being dried should be no larger than on the order of about ¾ inch thick and preferably less than ½ an inch thick. The size limits, of course will depend upon the nature of the product.

The invention will now be described by way of example with reference to the figures wherein:

FIGURE 1 is a semi-diagramatic longitudinal sectional view of an apparatus embodying the invention.

FIGURE 2 is a perspective view of a preferred form of desiccating apparatus employed in the invention.

Shown in the drawings is a freezing chamber 10 consisting of an initial preliminary cooling section 12, a secondary cooling station 14 and a final cooling section 16 through which products 18 that are to be frozen and subsequently dried are transported by endless belt conveyors 20, 22 and 24 driven in the proper direction to transfer the products from right to left as seen in the drawings. The housing of the cryogenic freezing apparatus 10 preferably consists of a vacuum-insulated double wall cylinder.

As the products enter the pre-cooling section 12 they pass under a rubber door 26 and travel beneath a plurality of openings 28 through which a cool substantially oxygen-free gas is supplied as shown by dotted lines 30. Refrigerated nitrogen gas is introduced through a duct 32 from a blower 34. This gas consists of the nitrogen gas evolved during subsequent exposure of the product to liquid nitrogen in the final freezing section 16. As the product travels through section 12, the downward flow of refrigerated nitrogen rapidly chills the surface of the product until it reaches a temperature somewhat above freezing. The product then passes out of the section 12 and enters section 14. The pre-cooled product on the conveyor is chilled further as it travels through the secondary cooling section 14 again by downward flow of refrigerated gaseous nitrogen as shown at 36 that was introduced from the blower 34 through openings 38. The cool gas after flowing downwardly over the conveyor 24 is exhausted through a duct 40 that is connected to the inlet of the blower 34 by a duct 42. As mentioned briefly above, a portion of the refrigerated nitrogen expelled by blower 34 is passed to section 12 through line 32 and the remaining portion is re-introduced to the section 14 through a duct 44. The liquid nitrogen spray zone located in the final cooling section 16 can also include spray nozzles below the product as well as above it. If desired, gas nozzles can be positioned at the inlet and outlet openings at each end of the apparatus for directing a high velocity flow of cold gas to provide a curtain adjacent each opening to restrict the infiltration of the atmospheric air.

In the final cooling section 16, the product passes beneath sprays of nitrogen 46 in a liquid state. Liquid nitrogen is introduced through a line 48 from a supply duct 50. The liquid nitrogen then flows over the conveyor 24 to a collection pan 52 and through a pipe 54 to an external reservoir 56. A filter 58 is provided at the lower end of pipe 54 for removing sediment. A pump 60 driven by motor 62 returns liquid nitrogen through a duct 63 to the feed line 48 under the control of a liquid level controller 64. The liquid nitrogen supplied to the cryogenic freezer is transferred through the pipes 48 and 50 at a pressure on the order of 5–7 lbs. per square inch gauge by the centrifugal pump 60. As mentioned briefly above, a portion of the excess liquid is collected in the pan 52 and is recirculated through duct 62 to the spray line 48. The remaining portion flashes to a gas when contact is made with the product and it is this evolved gas that is recirculated through the preliminary cooling sections 12 and 14 and is then exhausted from the precooling section 12 to the drying compartment 68. The product is then carried to the drying compartment 68 where the drying operation is performed. During the transfer to the drying compartment 68 care must, of course, be taken to maintain the product in a frozen condition.

Relatively cold nitrogen gas substantially free of oxygen is exhausted from the precooling chamber 12 through a duct 80. Duct 80 is insulated to prevent heating of the inert gas. Excess gas flowing out of the precooling section 12, can, if desired, be vented to the atmosphere through an exhaust duct 84 by a metering valve 86. The gas flowing through duct 80 passes into a circulation duct 82. The nitrogen introduced to circulation duct 82 is maintained at a moisture level below saturation by a desiccation unit 92 so that the ice core is not in equilibrium with its surrounding environment. During the process, heat is transferred to the ice core from the surrounding nitrogen thus causing sublimation of moisture up to the saturation point of the surrounding gas.

A variety of factors limit the rate at which drying takes place, among them being the temperature and humidity of the drying atmosphere, the temperature of the ice core, the diffusivity of the material and the mass transfer coefficient.

The drying compartment 68 includes the usual walls, roof, floor and refrigeration equipment (not shown). Doorways for introducing and removing the products that are to be dried are not shown. The duct 82 is connected to storage bins 90 to be described below. The compartment 68 can comprise a storage warehouse building as described completely in my prior application referred to hereinabove. In the event the compartment 68 is a warehouse, the bins 124 which will be described below are placed in the warehouse by means of standard materials handling equipment such as fork lift trucks and connected to the dryer only for a sufficient period of time to reduce the moisture of the products within each bin to the required level. The bins are then disconnected, sealed and removed from the storage warehouse during the remainder of their normal storage period.

While a variety of different desiccating units, either chemical or mechanical (those employing cooling coils) can be used, a chemical desiccator is illustrated by way of example. Suitable chemical desiccants include silica gel, alumina and molecular sieves. The desiccator includes a housing 92 having a gaseous nitrogen drying compartment 94 and a desiccant regenerating compartment 96 which is separated from the gaseous nitrogen drying compartment 94 by means of a partition divided into two sections 98 and 100, between which is provided a porous desiccant supporting drum 102 suitably mounted for rotation upon a vertically disposed shaft 104. Supporting drum 102 in a position to prevent the flow of gaseous nitrogen around the sides of the drum is a horizontally disposed sealing partition 106. An electric motor 108 suitably connected to a driving cylinder 110 is positioned to contact the outside surface of drum 102 to cause it to rotate. During operation the humidified gaseous nitrogen that is to be dried passes through the drum 102 and into moisture transfer relationship with the desiccating agent therein (from right to left as seen in FIGURE 2). Simultaneously, heated air is forced by the blowers 116 and 118 (from left to right as seen in FIGURE 2) past a heating element 119 and through the segment of the drum within the compartment 96.

The dried gaseous nitrogen is exhausted from the desiccating unit 92 through an exhaust section 120 of duct 82. It then passes through a heat exchange 122 of any suitable known construction where it is either cooled or warmed as required. The gaseous nitrogen fed to the bins is ordinarily held at the same temperature as the gaseous nitrogen in the chamber 68 which is usually about +10° F.—20° F. A plurality of bins designated 124 are provided within chamber 68.

In operation, the desiccating gas is introduced through flexible hoses 130 and 132. It then circulates freely through the interstices between the pieces in bins 124 and is exhausted to duct 82 through hoses 134 and 136. Gas is vented to the atmosphere by valve 138 at the same rate it is introduced through duct 80. The flow rate through duct 82 is controlled by valve 139. As this takes place, a dried porous layer will begin to form on the surfaces of each of the particles as the moisture contained in the frozen center portion of each piece is removed by sublimation.

Each bin 124 consists of an air-tight enclosure formed from an imperforate material defined by side walls, a bottom and a removable cover 124a through which the product is introduced and removed and a false bottom formed from perforated material 124b. The walls, cover and bottom of the bins can be formed from any suitable material such as sheet metal.

During operation, the desiccated gaseous nitrogen passes into the bins 124 through the flexible hoses 130 and 132 respectively, thence upwardly through the perforate false bottom 124b through the passages between the pieces of products that are being dried. The moisture-laden gaseous nitrogen is then exhausted through ducts 134 and 136 and is returned to the inlet of the desiccating unit 92 through line 82. As described above in connection with FIGURES 2-4, the gaseous nitrogen is recycled continuously throughout operation.

As the gas is transferred from the freezing section to the drying section, care is taken to maintain its temperature with as little heat gain as possible. By insulating the duct work thereby utilizing the cold temperature of the evolved gas for maintaining the dried products under refrigeration and in this way improving over-all thermal efficiency.

The temperature of the material being dried after leaving the freezer is preferably on the order of about —20° F. to +10° F. During the drying operation within the chamber 68, the temperature of the material being dried is preferably maintained at about 0° F. to +10° F.

The invention will be better understood by reference to the following examples.

Example 1

Frozen cut green beans of commercial grade are placed in a wire mesh container 4 inches in diameter and 10 inches high. The beans are frozen by introducing them into a freezing apparatus shown in FIGURE 1 to thereby expose them first to nitrogen gas at a temperature of about —100° F. to precool them and finally in the last stage of the freezing operation to liquid nitrogen gas at a temperature approaching —340° F. for a total time of 5 minutes. The beans are then collected in bins of the type shown in FIGURE 1 without being allowed to thaw and transferred to a drying chamber where the hoses provided on the bins are connected to a gas outlet leading from the freezing unit. The evolved nitrogen gas is then continuously recirculated through the bin, through a desiccating unit and a heat exchanger at the rate of about 200 cubic feet per minute. The gas transferred through the product in the bins is maintained at a temperature of —5° F. and at a dew point of —50° F.

TABLE 1

| Initial wt., grams | Final wt., grams | Air temp., °F. | Dew point, °F. | Drying time, hours |
|---|---|---|---|---|
| 781.1 | 384.0 | 0 to +12 | —95 to —30 | 493 |
| 783.1 | 369.9 | —4 to 0 | —90 to —30 | 1,269 |

Upon rehydration in water the color and shape is completely restored and the beans had excellent flavor and texture.

Example II

Fresh potatoes are cut into a solid cylinder of ⅜ inch diameter and of random lengths and are then frozen as in Example I. They are dried in the same manner as the beans in Example I. The results are shown in Table 2.

TABLE 2

| Initial wt., grams | Final wt., grams | Air temp., °F. | Dew point, °F. | Drying time, hours |
|---|---|---|---|---|
| 658.7 | 314.8 | +4 to +8 | —78 to —50 | 248 |
| 644.7 | 297.4 | +2 to +4 | —50 to —45 | 868.75 |

The dried potato cylinders rehydrated readily in water.

Many variations can be made in the invention. One such variation is to employ conventional vacuum freeze-drying for a period of time prior to the present method to bring the moisture level to about 10% of its original level. This procedure makes use of the conventional vacuum freeze-drying process during its most efficient phase and relatively slow drying rates realized during the last portion of the process are accomplished effectively at a reasonable cost.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A freeze-drying apparatus for drying products in a frozen condition comprising a freezing chamber for freezing the products under cryogenic conditions, a means for transferring a liquified or solidified normally gaseous heat transfer medium to the freezing chamber, said freezing chamber having inlet and outlet openings for introducing and removing frozen product therefrom, a duct means communicating with the freeznig chamber for collecting and exhausting gas evolved in the process of freezing the products in the chamber, a drying chamber communicatively connected to the exhaust duct whereby the evolved gas passing through the exhaust duct is transferred in heat and mass transfer relationship with the frozen product in the drying chamber.

2. The apparatus according to claim 1 wherein a blower means is operatively associated with the drying chamber and the exhaust duct for forcing the gas through the frozen product in the drying chamber at a predetermined rate.

3. The apparatus according to claim 1 wherein a desiccating unit is communicatively connected between the exhaust duct and the stored product for removing excess humidity from the evolved gas prior to passing it through frozen products in storage.

4. The apparatus according to claim 1 wherein the drying compartment comprises a storage warehouse including a roof, walls and floor whereby the product can be dried during its normal storage period in the warehouse.

5. The apparatus according to claim 1 wherein the product is stored within a plurality of imperforate bins provided within a storage chamber and each one of the bins is communicatively connected to the duct means.

6. The apparatus according to claim 5 wherein a desiccating and heat exchange unit are communicatively connected between the duct means and the bins for drying and maintaining the temperature of the evolved gas prior to being introduced in a heat and mass transfer relationship with the stored product in the bins.

7. The apparatus according to claim 6 wherein each of the bins is provided with an outlet duct communicating with the inlet of the desiccating unit and heat exchanger to define a gas circulation loop and a blower is communicatively connected with the loop for repeatedly circulating the gas evolved during hte freezing operation through the desiccating unit and the heat exchanger and the product stored within the drying compartment.

8. A method of freeze-drying products comprising exposing the products to a refrigerated substantially oxygen-free heat normally gaseous transfer medium maintained in the liquid or solid state to thereby reduce the temperature of the material to a temperature that is sufficiently low to freeze the moisture contaned therein, collecting the evolved gases, maintaining the frozen products at a temperature that is sufficiently low to prevent melting of the moisture contained therein, maintaining the humidity level of the collected gas sufficiently low to hold its dew point at a temperature below the temperature of the frozen products, maintaining the collected gas at a sufficiently low temperature to prevent melting of said materials, conveying the gas thus collected in heat and mass transfer relationship with said frozen products for a period of time sufficient to reduce the moisture level thereof to a total moisture content of less than 10% by weight.

9. The method of claim 8 wherein the heat transfer medium comprises a substantially oxygen-free refrigerated and liquified nitrogen gas.

10. The method of claim 8 wherein the gas that is conveyed in heat and mass transfer relationship with the frozen product is thereafter collected, dried and its temperature adjusted to a predetermined value and is then continuously recirculated through the frozen products.

11. The method of claim 8 wherein the heat transfer medium is collected and maintained in a refrigerated condition while being transferred to the frozen products that are to be dried thereby minimizing heat uptake in the heat transfer medium.

12. The method according to claim 8 wherein the refrigerated heat transfer medium comprises liquid nitrogen initially at a temperature on the order of about $-320°$ F., the evolved nitrogen gas is collected and continuously recirculated through a mass of products frozen by exposure to the liquid nitrogen while being maintained in a frozen condition and the temperature and humidity of the recirculated gas is maintained at a predetermined value while being circulated through the frozen product.

References Cited

UNITED STATES PATENTS

| | | | |
|---|---|---|---|
| 3,218,728 | 11/1965 | Barth | 34—5 |
| 3,222,796 | 12/1965 | Jeppson | 34—5 |
| 3,238,638 | 3/1966 | Hamilton | 34—92 |
| 3,293,772 | 12/1966 | Gottfried | 34—92 |
| 3,313,032 | 4/1967 | Molecki | 34—5 |

WILLIAM J. WYE, Primary Examiner

U.S. Cl. X.R.

34—92

UNITED STATES PATENT OFFICE
CERTIFICATE OF CORRECTION

Patent No. 3,458,941 August 5, 1969

Rolf Gunnar Gidlow

It is certified that error appears in the above identified patent and that said Letters Patent are hereby corrected as shown below:

Column 7, line 28, "free heat normally gaseous" should read -- free normally gaseous heat --.

Signed and sealed this 15th day of December 1970.

(SEAL)
Attest:

Edward M. Fletcher, Jr.
Attesting Officer

WILLIAM E. SCHUYLER, JR.
Commissioner of Patents